May 14, 1935.　　　C. F. JOERS　　　2,001,363
FLASH LIGHT
Filed May 22, 1933
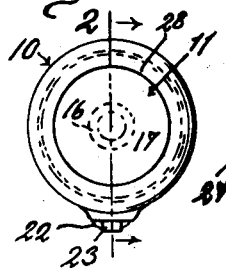
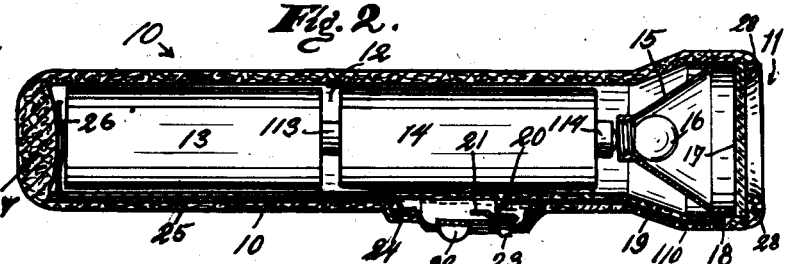
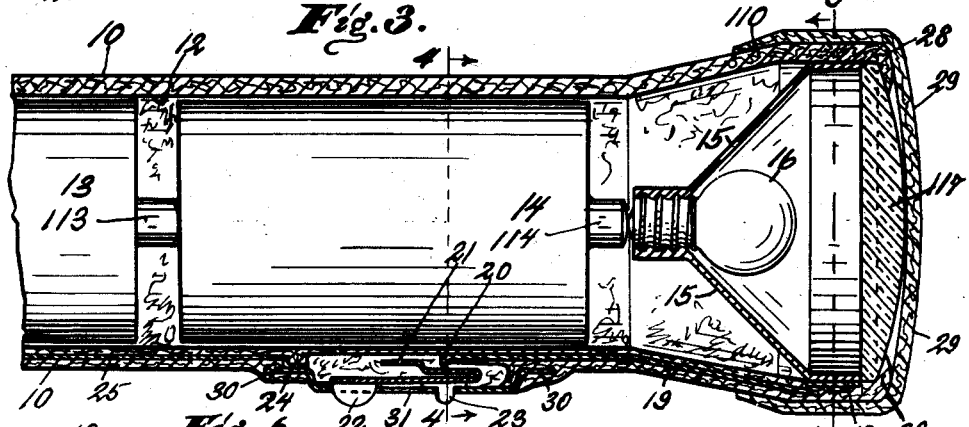
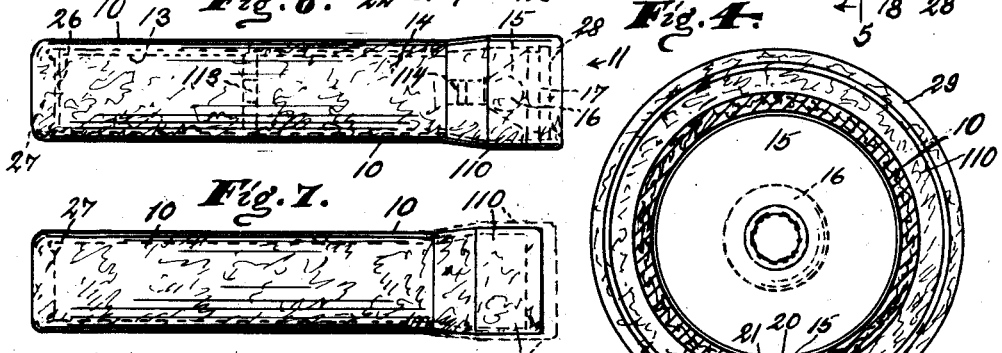
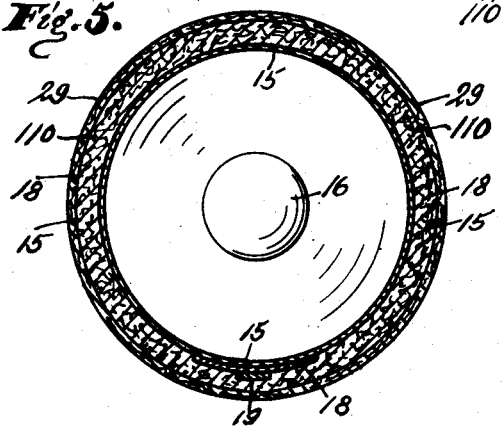
Inventor.
Carl F. Joers.
By
William M. Gentle
His Attorney.

Patented May 14, 1935

2,001,363

UNITED STATES PATENT OFFICE 2,001,363

FLASH LIGHT

Carl F. Joers, Los Angeles, Calif.

Application May 22, 1933, Serial No. 672,262

3 Claims. (Cl. 240—10.66)

This invention relates to a flash-light, and the principal object is to provide such a device which, in addition to being air, dust and waterproof, is also practically unbreakable and shockproof.

To that end I provide a flash-light having a resilient body preferably formed of rubber in which the battery, lamp and lens are enclosed so the interior is air, dust and water-proof for the purpose of preventing the interior parts from deteriorating by contact with the elements mentioned; and also the device has its body preferably formed of rubber so it can be handled in a rough manner without injuring the parts by shock or breakage.

As is well-known, flash-lights are often used in places where they are accidentally dropped on cement floors and the like, thereby often breaking the lamp and lens, and an object of this invention is to provide a flash-light in which such breakage cannot occur.

Features of invention are shown in providing a flash-light in which the longitudinal and also the radial tension of the body holds the interior parts together, and also aids in holding the lens in the open end so as to close it against the passage of air, dust and water either into or out of the body.

Other objects, advantages and features of invention may appear from the accompanying drawing, the subjoined detailed description and the appended claims. The accompanying drawing illustrates the invention, in which:

Figure 1 is a front end view of a flash-light that is constructed in accordance with this invention.

Fig. 2 is a central longitudinal section on the line 2—2, Fig. 1, with some of the parts shown semi-diagrammatically; also showing the flash-light with a disk-shaped lens.

Fig. 3 is a sectional view of the front end portion of Fig. 2 on a much larger scale showing the flash-light provided with a plano-convex lens; and also showing a flexible cover.

Fig. 4 is a cross section on line 4—4, Fig. 3, with the battery omitted, showing the edge flanges of the switch casing embedded in the outer wall of the rubber body.

Fig. 5 is another cross section on the line 5—5 of Fig. 3 showing the rim of the lamp frame in contact with the segmental terminal that is partly imbedded in the inner wall of the body at its open end.

Fig. 6 is a side view of the rubber body with parts assembled therein, showing it expanded both longitudinally and radially so the tension thereof will firmly hold the lamp and battery in contact and also so the radial tension will hold the open rubber end of the body in contact with the rim of the lens to form an air-tight closure thereto.

Fig. 7 is a view analogous to Fig. 6 with the interior parts removed and showing the rubber body contracted both longitudinally and radially.

My flash-light includes a cylindrical, resilient body 10 that is preferably formed of rubber, and it has an end 11 that opens into a cylindrical chamber 12 in which a storage battery is arranged and preferably this battery includes the cells 13 and 14 that have the usual extended terminal ends 113 and 114.

The body 10 has a head 110 that is slightly enlarged and adapted to be expanded radially by the annular rim of a lamp frame 15 in which an electric lamp is arranged in circuit with the battery.

A lens 17 is arranged in front of the rim of the lamp frame and is held in close contact therewith by an inwardly extending flange 28, the tension of which, together with the expanded body and head, form an air, dust and water-tight fit between the lens, flange and head.

Embedded in the head 110 adjacent its open end 11 is a segmental terminal 18 that is in contact with the lamp frame when the parts are assembled.

A metal strip 19 is embedded in the head and body of the flash-light and has one end in circuit with said segmental terminal 18. Its other terminal end 20 is exposed in a chamber of a switch casing so it can be engaged or disengaged by a spring terminal 21 that is moved either by a slide 22 or a push button 23 to engage the terminal end 20.

Another metal strip 24 that is embedded in the body 10 has one end connected to the switch casing 31 so it is in circuit with the spring terminal 21, and its other end 26 is extended out of the wall of the body 10 into contact with one end of the battery, as shown in Fig. 2, and this arrangement of parts completes the circuit through the lamp, switch and battery.

Preferably I provide a rubber cap 29 that is extended over the head 110 to close the open end 11 and to additionally protect the lens 17 when the flash-light is not in use. This cap is of great use in protecting the lens 117 when a plano-convex lens is used, such as is shown in Fig. 3. Also the cap aids in preventing the passage of air, dust or moisture into the chamber 12 to thereby have a deteriorating effect on the battery. In other words, I greatly prolong the life of the battery by having it enclosed in a relatively airtight chamber.

Preferably the switch casing 31 is arranged outside of the cylindrical body with its flanged edges 30 embedded in the rubber wall so that air, dust or water cannot enter the chamber 12 through the switch.

The end 27 and also the flange 28 are arranged to protect the interior parts from damage in the event that the flash-light is roughly handled.

As is well known, flash-lights are extensively used in garages, shops and the like having cement floors on which the flash-lights often accidentally fall to their serious injury; and also as is well known, the heavy battery end of the flash-light in long falls hits first, and for that reason I greatly reinforce the rubber end 27 so it will enable the flash-light to rebound when it falls to thereby take the shock off of the interior parts so they will not be injured.

Also the flange 28 is extended to protect the lens 17 as described.

My flash-light is used in the usual way. Either the slide 22 or push button 23 is used to move the spring terminal 21 into contact with the terminal 20 when the lamp is to be lighted. It is obvious that when the slide 22 is used to form this contact the lamp will remain lighted until the slide is reversely moved; but when the push button 23 is actuated to make this contact the spring tension of the terminal 21 will automatically release it from the terminal 20 as soon as pressure is released on the push button.

As semidiagrammatically illustrated in Figs. 6 and 7 the rubber body 10 and head 110 are constructed so the body is expanded longitudinally and the head radially when the interior parts are secured therein, so that both the longitudinal and radial tension aid in forming an air, dust and water-tight seal between the open end 11 and the lens 17.

What I claim as my invention is:

1. A flash-light including a hollow cylindrical rubber body having an open and a closed end, a segmental terminal partly imbedded in said body adjacent its open end, a battery in said body, a lamp frame having an annular rim in contact with said terminal, a lamp in said frame, a metal casing on the exterior of said body that has its edge portion embedded therein, a metal strip connecting said segmental terminal with a terminal within said casing, another metal strip connecting said casing with an end of said battery to complete an electrical circuit through said lamp, and a push button slide in said casing for opening and closing the circuit through said lamp, said flash-light constructed so that the longitudinal and radial tension of said body holds the interior parts together.

2. A flash-light including a hollow cylindrical rubber body having an open and a closed end, an inwardly extending annular rubber flange at the open end of said body, a segmental terminal partly imbedded in the inner wall of said body adjacent its open end, a battery in said body, a lamp frame having an annular rim in contact with said terminal, a lamp in said frame that is in circuit with said battery, a casing having edge portions embedded in the outer wall of said body, a metal strip embedded in the wall of said body that connects said segmental terminal with another terminal within said casing, another metal strip embedded in the wall of said body that connects said casing with one end of said battery to thereby complete an electrical circuit through said lamp, and a push button slide in said casing for engaging or disengaging the terminal therein to thereby open or close the electrical circuit through said lamp, said flash-light constructed so that longitudinal and radial tension of said body holds the interior parts together.

3. A flash-light including a hollow cylindrical rubber body having open and closed ends, an inwardly extending annular rubber flange at the open end of said body, a segmental terminal partly imbedded in the inner wall of said body adjacent its open end, a battery in said body, a lamp frame having an annular rim in contact with said terminal, a lamp in said frame that is in circuit with said battery, a casing having edge portions embedded in the outer wall of said body, a metal strip embedded in the wall of said body that connects said segmental terminal with another terminal within said casing, another metal strip embedded in the wall of said body that connects said casing with one end of said battery to thereby complete an electrical circuit through said lamp, a push button slide in said casing for engaging or disengaging the terminal therein to thereby open or close the electrical circuit through said lamp, and a lens interposed between said flange and the annular rim of said frame, said body expanded both longitudinally and radially so the tension thereof will hold said parts together and also form an airtight seal between said lens and flange.

CARL F. JOERS.